US012811463B2

(12) United States Patent
Guo et al.

(10) Patent No.: US 12,811,463 B2
(45) Date of Patent: Nov. 24, 2026

(54) SEALING STRUCTURE, INNER WHEEL DRIVE SYSTEM AND ASSEMBLY METHOD

(71) Applicant: Schaeffler Technologies AG & Co. KG, Herzogenaurach (DE)

(72) Inventors: Huaiwei Guo, Shanghai (CN); Xiangyang Cai, Jiangsu (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 319 days.

(21) Appl. No.: 18/690,576

(22) PCT Filed: Sep. 9, 2021

(86) PCT No.: PCT/CN2021/117340
§ 371 (c)(1),
(2) Date: Mar. 8, 2024

(87) PCT Pub. No.: WO2023/035167
PCT Pub. Date: Mar. 16, 2023

(65) Prior Publication Data
US 2025/0141297 A1 May 1, 2025

(51) Int. Cl.
*H02K 5/10* (2006.01)
*B60B 21/12* (2006.01)
*H02K 15/40* (2025.01)

(52) U.S. Cl.
CPC ............... *H02K 5/10* (2013.01); *B60B 21/12* (2013.01); *H02K 15/40* (2025.01)

(58) Field of Classification Search
CPC ...... F16J 15/3436; F16J 15/3264; H02K 5/10; H02K 15/40; B60B 21/12; F16C 33/76; F16C 2326/02
(Continued)

(56) References Cited

U.S. PATENT DOCUMENTS 10,119,571 B2 * 11/2018 Seno ........................ F16C 33/80
11,796,004 B2 * 10/2023 Seki ..................... F16C 33/7823
(Continued)

FOREIGN PATENT DOCUMENTS

CN 102837749 A 12/2012
CN 205877197 U 1/2017
(Continued)

*Primary Examiner* — Nathan Cumar
(74) *Attorney, Agent, or Firm* — Suiter Swantz IP

(57) ABSTRACT

A sealing structure, an inner wheel drive system and a method for assembling a dustproof member in a sealing structure. The sealing structure is used for sealing a radial clearance between a first component and a second component, and comprises a sealing member and a dustproof member, wherein the sealing member is sealed in the radial clearance, the dustproof member is located on an axial outer side of the sealing member, a first end of the dustproof member is fixed on the first component, an opposite second end extends in a radial direction so as to cover the radial clearance, and the second end and the second component are spaced apart and partially overlap with each other in an axial direction. Since the dustproof member is not arranged in the radial clearance, the axial size of the radial clearance is reduced, and axial sizes of the first component and the second component are also accordingly reduced. The sealing structure is especially suitable for the inner wheel drive system, is helpful for reducing the axial size of the inner wheel drive system, and improves the applicability of the inner wheel drive system.

20 Claims, 5 Drawing Sheets

(58) Field of Classification Search
USPC .......................................................... 277/412
See application file for complete search history.

(56) References Cited

U.S. PATENT DOCUMENTS

| | | | | |
|---|---|---|---|---|
| 2005/0052043 | A1* | 3/2005 | Brister .................. | F16C 35/063 295/36.1 |
| 2011/0064347 | A1* | 3/2011 | Hubbard ............... | F16C 35/063 384/564 |
| 2013/0127119 | A1* | 5/2013 | Haepp ................. | F16C 33/7889 277/572 |
| 2014/0003753 | A1* | 1/2014 | Haepp ................... | F16C 33/805 384/480 |

FOREIGN PATENT DOCUMENTS

| | | | | |
|---|---|---|---|---|
| CN | 207033996 | U | | 2/2018 |
| CN | 208966862 | U | | 6/2019 |
| CN | 209448548 | U | * | 9/2019 |
| CN | 112727932 | A | | 4/2021 |

* cited by examiner

SEALING STRUCTURE, INNER WHEEL DRIVE SYSTEM AND ASSEMBLY METHOD

CROSS-REFERENCE TO RELATED APPLICATION

The present application is the U.S. National Phase of PCT Patent Application Number PCT/CN2021/117340, filed on Sep. 9, 2021, the entire disclosure of which is incorporated by reference herein.

TECHNICAL FIELD

The disclosure relates to the technical field of sealing devices, in particular to a sealing structure, an inner wheel drive system and an assembly method.

BACKGROUND

In an inner wheel drive (IWD) system, a drive device is integrated into an inner wheel. During driving, a relative rotation between a housing and a rotating shaft of the inner wheel drive system will occur. Therefore, grease or the like is usually required to be provided as a lubricant between the housing and the rotating shaft, and in order to prevent the leakage of the lubricant, a sealing device is further required to be mounted to seal the lubricant.

FIG. 1 shows a sealing structure 900 formed after a sealing device is assembled to an inner wheel drive system. The left side in FIG. 1 shows an axial outer side of the inner wheel drive system, and the right side shows an axial inner side of the inner wheel drive system. The sealing device is fitted at a radial clearance between a housing 901 and a rotating shaft 902 of the inner wheel drive system in an interference mode to seal the lubricant in a lubricating space located on the axial inner side. Further, the sealing device comprises an oil seal 904 and a dust cover 903, the dust cover 903 being arranged at an axial outer side of the oil seal 904 (that is, the left side in FIG. 2) to prevent external contamination (such as water, dust and other contaminants) from entering the sealing device.

However, during the specific use of the inner wheel drive system, the inner wheel drive system will experience external impacts and generate vibrations, thus leading to the following two main problems:

The rotating shaft 902 will generate an axial relative displacement with respect to the housing 901. Therefore, it is necessary to reserve a certain clearance between the dust cover 903 and a sealing lip 9041 of the oil seal 904, both of which are arranged in the radial clearance, to prevent the dust cover 903 and the sealing lip 9041 from interfering with each other. For example, when the rotating shaft 902 may generate an axial displacement of approximately 1 mm relative to the housing 901, it is necessary to reserve a clearance of approximately 2 mm between the dust cover 903 and the sealing lip 9041. This results in the requirement that the inner wheel motor have a sufficient length in an axial direction.

At the same time, in order to ensure that the dust cover 903 and the rotating shaft 902 are able to maintain a stable fitting therebetween when the inner wheel drive system is subject to an external impact and runs at a high speed, the dust cover 903 is also required to have more contact area with the rotating shaft 902. Generally, it is necessary to increase a fitting length of the rotating shaft 902 and the dust cover 903 in the axial direction to ensure the fitting stability therebetween.

It can thus be seen that in the existing sealing structure 900, since the dust cover 903 and the oil seal 904 are both arranged at the same-diameter positions (that is, are both arranged in the radial clearance), a sufficient axial length is required to solve the above two problems, which enables an axial length of the inner wheel drive system to be longer, accordingly affects the applicability of the inner wheel drive system in some scenarios, and especially restricts the application of the inner wheel drive system in narrow and small spaces.

SUMMARY

The object of the present disclosure is to solve the deficiencies in the prior art, whereby a sealing structure, an inner wheel drive system and an assembly method are provided, and an axial length required for mounting the sealing structure can be reduced.

In order to achieve the above-mentioned objective, the present disclosure provides a sealing structure used for sealing a radial clearance between a first component and a second component. The sealing structure comprises a sealing member and a dustproof member, wherein the sealing member is sealed in the radial clearance, the dustproof member is located on an axial outer side of the sealing member, a first end of the dustproof member is fixed on the first component, an opposite second end extends in a radial direction so as to cover the radial clearance, and the second end and the second component are spaced apart and partially overlap with each other in an axial direction.

Optionally, the dustproof member comprises a mounting part arranged on an axial inner side of the first end; the first component is provided with a fitting part corresponding to the mounting part; and the mounting part can be fitted with the fitting part to fix the dustproof member.

Optionally, the mounting part is a first axial extension segment protruding from the first end toward the first component, the fitting part is an axial fitting groove located on an end face of an axial outer side of the first component, and the first axial extension segment is fitted into the axial fitting groove in an interference mode.

Optionally, the first axial extension segment abuts against a first side wall of the axial fitting groove, and a radial avoidance clearance is formed between the first axial extension segment and a second side wall of the axial fitting groove, wherein the first side wall is located on a radial inner side of the axial fitting groove, and the second side wall is located on a radial outer side of the axial fitting groove.

Optionally, the first component is provided with a stopping part in the axial direction, wherein the stopping part does not exceed an axial end face of the first component in a direction of the axial outer side of the first component, and the stopping part is used for being stopped on an axial inner side of the dustproof member to position the dustproof member.

Optionally, the dustproof member comprises a dustproof segment arranged on an axial inner side of the second end, and the dustproof segment and the second component partially overlap with each other in the axial direction.

Optionally, the second component is provided with an avoidance part, wherein the avoidance part corresponds to the dustproof segment, a labyrinth clearance having at least one bend is formed between the avoidance part and the dustproof segment, and the labyrinth clearance is in communication to the radial clearance.

Optionally, the axial outer side of the sealing member is further provided with a sealing lip, and the sealing lip has an annular sealing groove arranged toward a radial outer side.

The present disclosure further provides an inner wheel drive system, comprising a first component, a second component, the aforementioned sealing structure and a wheel rim, wherein the first component is a rotating shaft of the inner wheel drive system; the second component is a housing of the inner wheel drive system, wherein the housing surrounds the rotating shaft in a circumferential direction; and the wheel rim is pressed against an axial outer side of the dustproof member.

The present disclosure further provides a method for assembling a dustproof member in a sealing structure, the sealing structure being used for sealing a radial clearance between a first component and a second component, the sealing structure comprising a sealing member and a dustproof member, and the sealing member being sealed in the radial clearance, wherein the dustproof member has a first end and a second end opposite to each other, the first end is provided with a mounting part, and the first component is provided with a fitting part corresponding to the mounting part, and is provided with a stopping part.

During assembly, the mounting part is fitted into the fitting part and a position of the dustproof member is adjusted until the stopping part is stopped on an axial inner side of the dustproof member, so that the second end and the second component are spaced apart and partially overlap with each other in an axial direction.

The present disclosure has at least the following beneficial effects:

The present disclosure provides a sealing structure, an inner wheel drive system and an assembly method. In the sealing structure, since the dustproof member is arranged on an axial outer side of the radial clearance and is no longer arranged at the same-diameter position together with the sealing member, that is, it is no longer arranged in the radial clearance, an axial size of the radial clearance is reduced, and axial sizes of the first component and the second component are also accordingly reduced. At the same time, by the arrangement and fitting of the mounting part and the fitting part, the dustproof member is fixed; and by the arrangement of the stopping part, the dustproof member can be adjusted more conveniently and quickly to the position where it is required to be mounted, and it is helpful for achieving the positioning, mounting and stable fitting of the dustproof member. Moreover, for the clearance between the dustproof member and the second component, by the arrangement of the dustproof segment, the possibility of external contamination entering the radial clearance from the first clearance is reduced, and it is helpful for prolonging the service life of the sealing structure. The sealing structure is especially applicable to the inner wheel drive system, is helpful for reducing the axial size of the inner wheel drive system, and improves the applicability of the inner wheel drive system.

In the figures: 100. sealing structure; 110. first component; 111. axial fitting groove; 1111. first side wall; 1112. second side wall; 1113. avoidance clearance; 112. stopping part; 120. second component; 121. first clearance; 122. notch; 123. second clearance; 124. third clearance; 130. radial clearance; 140. sealing member; 141. frame; 142. elastic sealing body; 1421. first sealing lip; 1422. second sealing lip; 1423. third sealing lip; 143. spring; 150. dustproof member; 151. radial segment; 152. first axial extension segment; 153. second axial extension segment; 201. wheel rim; 202. rotating shaft; 900. sealing structure; 901. housing; 902. rotating shaft; 903. dust cover; 904. oil seal; 9041. sealing lip.

DETAILED DESCRIPTION

The technical solutions in the embodiments of the present disclosure will be clearly and completely described below in combination with the drawings in the embodiments of the present disclosure. Obviously, the embodiments described are only some of the embodiments of the present disclosure and not all of the embodiments. All other embodiments obtained by those of ordinary skill in the art based on the embodiments of the present disclosure without creative efforts shall fall within the scope of protection of the present disclosure.

Figure 1:
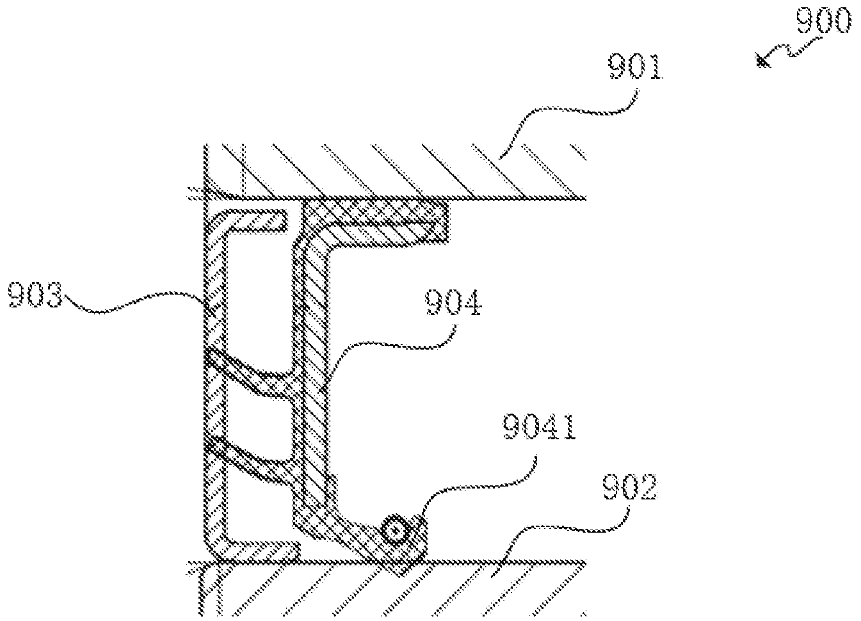
FIG. 1 exemplifies a schematic diagram of an existing sealing structure.
Figure 2:
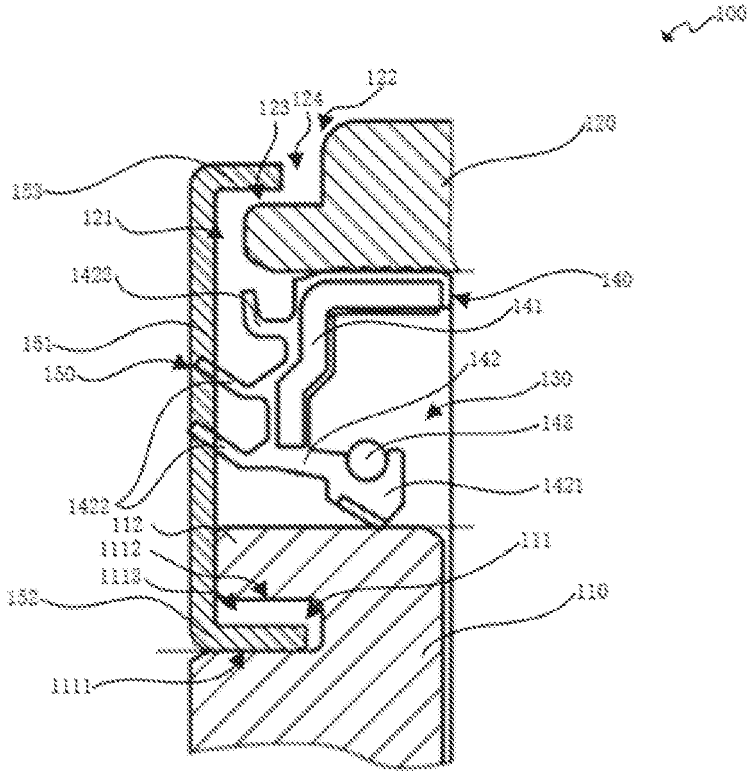
FIG. 2 exemplifies a schematic diagram of a sealing structure of the present disclosure.
Figure 3:
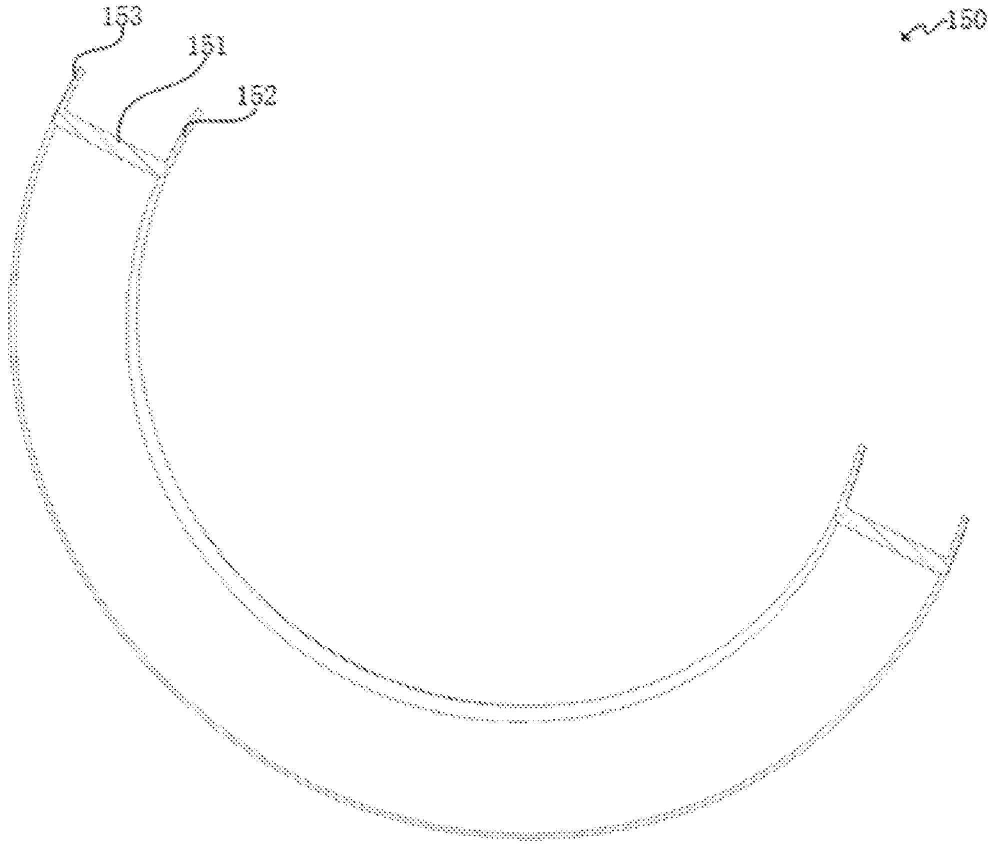
FIG. 3 exemplifies a half-sectional view of a dustproof member of the present disclosure.

With reference to FIG. 2 to FIG. 3, the present embodiment provides a sealing structure 100 used for sealing a radial clearance 130 between a first component 110 and a second component 120. The sealing structure 100 comprises a sealing member 140 and a dustproof member 150, wherein the sealing member 140 is sealed in the radial clearance 130, the dustproof member 150 is located on an axial outer side of the sealing member 140, the dustproof member 150 has a first end and a second end opposite to each other, the first end is fixed on the first component 110, the second end extends in a radial direction so as to cover the radial clearance 130, and at the same time, the second end and the second component 120 are spaced apart and partially overlap with each other in an axial direction.

Therein, since the dustproof member 150 is located on an axial outer side of the sealing member 140, that is, the dustproof member 150 is no longer located in the radial clearance 130, thus no longer occupies an internal space of the radial clearance 130 and especially no longer occupies an axial space of the radial clearance 130, an axial size of the radial clearance 130 is reduced, and axial sizes of the first component 110 and the second component 120 are accordingly reduced correspondingly.

Further specific examples and descriptions of the sealing structure 100 will be provided below in combination with the accompanying drawings.

With reference to FIG. 2, FIG. 2 shows a partial cross-sectional view of the first component 110 and the second component 120. It can be understood that the first component 110 and the second component 120 are both centrosymmetric structures along a dot-dash line shown in FIG. 2, and the first component 110 and the second component 120 can rotate relative to each other with the dot-dash line shown in FIG. 2 as a rotation axis. Therein, the second component 120 surrounds the first component 110 in a circumferential direction, and the radial clearance 130 is formed between the first component 110 and the second component 120.

In order to conduct lubrication for the relative rotation between the first component 110 and the second component 120, a lubricant for lubrication, such as lubricating oil, is required to be provided in the radial clearance 130. In FIG. 2, the left side shows an axial outer side and the right side shows an axial inner side. The sealing member 140 is arranged in the radial clearance 130 and is used for sealing the radial clearance 130 so as to form a lubricating space for accommodating the lubricant at a portion that is located on the axial inner side of the sealing member 140 (that is, the right side of the sealing member 140 in FIG. 2) in the radial clearance 130, and the sealing member 140 can prevent the lubricant from leaking from the axial inner side to the axial outer side (that is, leaking from the right side to the left side in FIG. 2). Specifically, the sealing member 140 may be an oil seal.

In some embodiments, the sealing member 140 comprises a frame 141 and an elastic sealing body 142 interconnected to each other, and the frame 141 and the elastic sealing body 142 are both annular structures. Therein, the frame 141 is a rigid structure and can be made of metal; the elastic sealing body 142 is an elastic structure and can be made of rubber or other elastic materials; and at least one first sealing lip 1421 is formed on the elastic sealing body 142. The sealing member 140 is fitted at the radial outer side of the first component 110 by the first sealing lip 1421, and is fitted at the radial inner side of the second component 120 by the frame 141, so that the sealing member 140 can be sealed at the radial clearance 130 between the first component 110 and the second component 120. Specifically, the sealing member 140 can be dynamically sealed at the radial clearance 130 between the first component 110 and the second component 120, that is, when the first component 110 and the second component 120 generate a relative rotation therebetween, the sealing member 140 can prevent the lubricant from leaking from the axial inner side to the axial outer side.

In a further embodiment, with reference to FIG. 2, the sealing member 140 also comprises a spring 143 in addition to the frame 141 and the elastic sealing body 142, wherein the spring 143 is also in a ring shape, is arranged on one side that is away from the first sealing lip 1421 of the first component 110 and is used for applying an elastic acting force to the first sealing lip 1421, so that the first sealing lip 1421 can be better fitted on a radial outer side of the first component 110 and provides a good dynamic sealing effect.

The dustproof member 150 arranged at an axial outer side of the radial clearance 130; and a first end of the dustproof member 150 is fixed to the first component 110, an opposite second end extends in a radial direction so as to cover the radial clearance 130, and the second end and the second component 120 are spaced apart and partially overlap with each other in an axial direction.

In some embodiments, the dustproof member 150 and the first component 110 are fixed, so that the dustproof member 150 can be fixed to the axial outer side of the radial clearance 130.

Further, the dustproof member 150 comprises a body and a mounting part arranged at a first end of the body, wherein the first end is one end of an axial inner side of the body, the first component 110 is provided with a fitting part located on an end face of an axial outer side corresponding to the mounting part, and the mounting part can be fitted with the fitting part, so that the body can be fixed to the axial outer side of the radial clearance 130.

Still further, the body is provided with a protruding first axial extension segment 152 at the first end toward the first component 110 to serve as the mounting part, the first component 110 is provided with an axial fitting groove 111 corresponding to the first axial extension segment 152 to serve as the fitting part, and the first axial extension segment 152 can be fitted into the fitting groove in an interference mode to fix the dustproof member 150 and the first component 110.

It can be understood that the first axial extension segment 152 approximately extends along the axial inner side, and the first axial extension segment 152 may have some bent segments in the process of extending along the axial inner side, which is not limited in the present embodiment.

Specifically, with reference to FIG. 2 and FIG. 3, the dustproof member 150 has a radial segment 151 arranged in the radial direction to serve as the body, and the radial segment 151 is provided with a first axial extension segment 152 protruding toward the axial inner side at a first end close to the first component 110 to serve as the mounting part. Specifically, in FIG. 2, a lower end of the radial segment 151 is provided with the first axial extension segment 152. Correspondingly, the first component 110 is provided with an axial fitting groove 111 corresponding to the first axial extension segment 152 to serve as the fitting part, and the first axial extension segment 152 abuts against a first side wall 1111 that is close to the radial inner side of the axial fitting groove 111 so as to fix the dustproof member 150 and the first component 110. At the same time, a radial avoidance clearance 1113 is formed between the first axial extension segment 152 and a second side wall 1112 that is close to the radial outer side of the axial fitting groove 111, and the avoidance clearance 1113 is helpful for avoiding a finish machining tool, so that the first side wall 1111 for abutting against the first axial extension segment 152 is formed, and the machining of the first side wall 1111 is made more convenient. At the same time, the avoidance clearance 1113 is also helpful for reducing the weight of the whole structure.

It can be understood that in other embodiments, the avoidance clearance 1113 may not be provided between the second side wall 1112 and the first axial extension segment 152, that is, the first side wall 1111 and the second side wall 1112 are both in interference fit with the first axial extension segment 152 to fix the dustproof member 150 and the first component 110.

In some embodiments, the first component 110 is provided with a stopping part 112 in the axial direction. The stopping part 112 is used for positioning the dustproof member 150, and an end face of the stopping part 112 does not exceed an axial end face of the first component 110 in a direction of the axial outer side of the first component 110. When the dustproof member 150 is located at a position where it is required to be mounted, the stopping part 112 can be stopped at an axial inner side of the dustproof member 150, so that the dustproof member 150 can be conveniently and quickly adjusted to the position where it is required to be mounted, and it is helpful for the positioning and mounting of the dustproof member 150. At the same time, during use, the stopping part 112 is also helpful for preventing the dustproof member 150 from generating a relative displacement with respect to the first component 110 toward the axial inner side, which is helpful for ensuring the stable connection of the dustproof member 150.

Specifically, with reference to FIG. 2, the first component 110 is provided with the axial fitting groove 111 (that is, the fitting part) for a fitted connection with the dustproof member 150. The stopping part 112 is formed on an upper side (that is, the radial outer side) next to the axial fitting groove 111, and the stopping part 112 is stopped at the axial inner side of the first radial segment 151 (that is, the body of the dustproof member 150), so as to conveniently and quickly position the dustproof member 150.

In some embodiments, a first clearance 121 is formed in the axial direction between the dustproof member 150 and the second component 120 while the dustproof member 150 is connected to the first component 110 to be fixed, that is, a clearance arrangement is formed between the dustproof member 150 and the second component 120. When the first component 110 generates a relative rotation with respect to the second component 120, the dustproof member 150 generates a relative rotation with respect to the second component 120 along with the first component 110. At that time, due to the existence of the first clearance 121, the dustproof member 150 does not generate a relative friction with the second component 120. It can be understood that the first clearance 121 may be formed because an axial end face of the second component does not exceed an axial end face of the first component in a direction of the axial outer side, or may be formed because the dustproof member 150 and the second component 120 have a corresponding structural size design, which is not limited in the present embodiment.

In some embodiments, the dustproof member 150 comprises the body and a dustproof segment arranged on the axial inner side that is located at the second end of the body. The dustproof segment is located on a radial outer side of the first clearance 121 and covers the first clearance 121 so as to reduce the possibility of external contamination entering the radial clearance 130 from the first clearance 121 to improve the effect of the dust cover on preventing the external contamination.

In a further embodiment, the second component 120 is provided with an avoidance part corresponding to the dustproof segment so as to avoid the dustproof segment. Moreover, a labyrinth clearance with at least one bend is formed between the avoidance part and the dustproof segment, and the labyrinth clearance is in communication with the first clearance 121.

Specifically, with reference to FIG. 2, the first clearance 121 is formed between the radial segment 151 (that is, the body) and an end face of an axial outer side of the second component 120. An upper end (that is, an end close to the second component 120) of the radial segment 151 is provided with second axial extension segment 153 protruding toward the axial inner side to serve as the dustproof segment. The end face of the axial outer side of the second component 120 is provided with a notch 122 to serve as the avoidance part, a second clearance 123 in a radial direction is formed between a radial inner side of the second axial extension segment 153 and a radial end face of the notch 122, and a third clearance 124 in an axial direction is formed between an axial inner side of the second axial extension segment 153 and an axial end face of the notch 122. The second clearance 123 and the third clearance 124 are perpendicular to each other and jointly form the labyrinth clearance. The labyrinth clearance is in communication with the first clearance 121. Therefore, on the basis of the second axial extension segment 153, the arrangement of the labyrinth clearance makes it difficult for the external contamination to enter a position of the radial clearance 130.

It can be understood that the second axial extension segment 153 approximately extends and protrudes along the axial inner side, and the second axial extension segment 153 may have some bent segments in the processes of extending and protruding along the axial inner side, which is not limited in the present embodiment.

In some embodiments, the axial outer side of the sealing member 140 is further provided with a second sealing lip 1422, and the second sealing lip 1422 is fitted on the axial inner side of the dustproof member 150 in an interference mode to block the external contamination from entering a lubricating space of the axial inner side along the radial clearance 130.

Specifically, with reference to FIG. 2, in the present embodiment, the axial outer side of the sealing member 140 is provided with two annular second sealing lips 1422 parallel to each other. The two sealing lips 1422 are both fitted on an axial inner side of the radial segment 151 (that is, the body of the dustproof member 150) in an interference mode.

In some embodiments, the axial outer side of the sealing member 140 is further provided with a third sealing lip 1423. An annular sealing groove arranged toward the radial outer side is formed on the third sealing lip 1423. The sealing groove is used for collecting external liquid contamination and discharging the external liquid contamination.

Specifically, with reference to FIG. 2, in the present embodiment, the axial outer side of the sealing member 140 is further provided with an annular third sealing lip 1423, the third sealing lip 1423 has the annular sealing groove arranged toward an upper side (that is, toward the first clearance 121 located on the radial outer side), during use, the external liquid contamination such as condensate water is collected into the sealing groove, and since the sealing groove is annular, the collected condensate water will flow to a low position along the annular sealing groove and is discharged, thereby preventing the condensate water from entering and contacting lip portions such as the first sealing lip 1421 and/or the second sealing lip 1422 of the sealing member 140 and avoiding the influence on an operating state of the sealing member 140, and the risk of causing the lip portions to generate a freezing phenomenon at low temperatures can be reduced.

It can be understood that the above-mentioned embodiments are all explained with the second component 120 surrounding the first component 110 in the circumferential direction as an example. However, in other embodiments, the positional relationship between the first component 110 and the second component 120 can also be that the first component 110 surrounds the second component 120 in the circumferential direction, and the relevant structural arrangement shown in the above embodiments can also be applied correspondingly, and can achieve the same technical effects.

It can thus be seen that in the sealing structure 100 provided in the present disclosure, since the dustproof member 150 is arranged at a position of the axial outer side of the radial clearance 130, and the dustproof member 150 is no longer arranged at the same-diameter position together with the sealing member 140, that is, it is no longer arranged in the radial clearance 130, an axial size of the radial clearance 130 is reduced, and axial sizes of the first component 110 and the second component 120 are also accordingly reduced. At the same time, by the arrangement and fitting of the mounting part and the fitting part, the dustproof member 150 is fixed; and by the arrangement of the stopping part 112, the dustproof member 150 can be adjusted more conveniently and quickly to the position where it is required to be mounted, and it is helpful for the positioning, mounting and stable fitting of the dustproof member 150. Moreover, for the first clearance 121 between the dustproof member

150 and the second component 120, by the arrangement of the dustproof segment, the possibility of external contamination entering the radial clearance 130 from the first clearance 121 is reduced.

Figure 4:
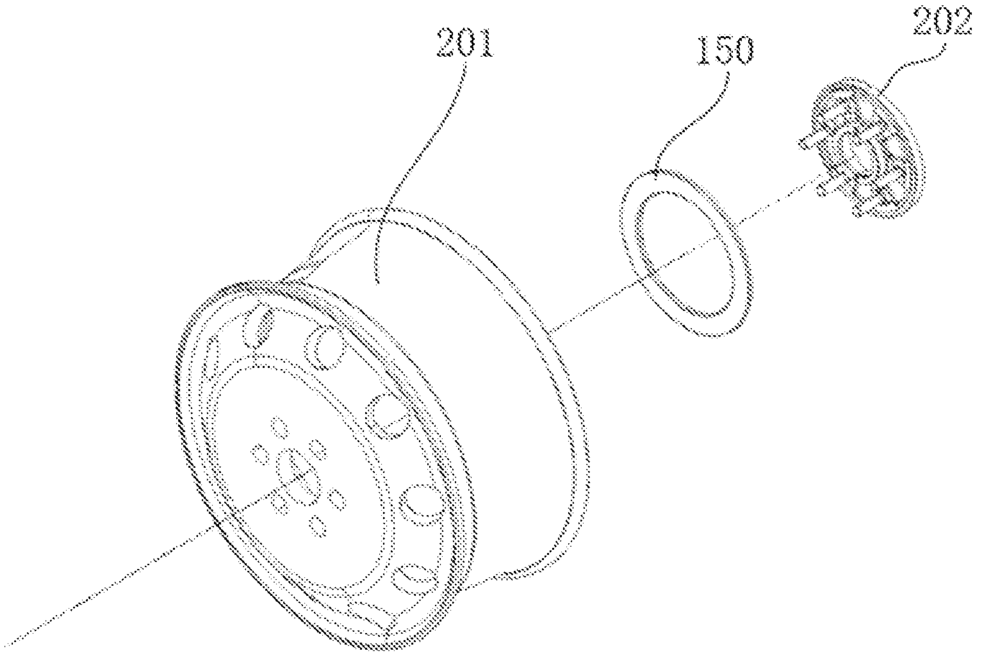
FIG. 4 exemplifies an exploded schematic view for fitting a dustproof member with a wheel rim and a rotating shaft in the present disclosure.
Figure 5:
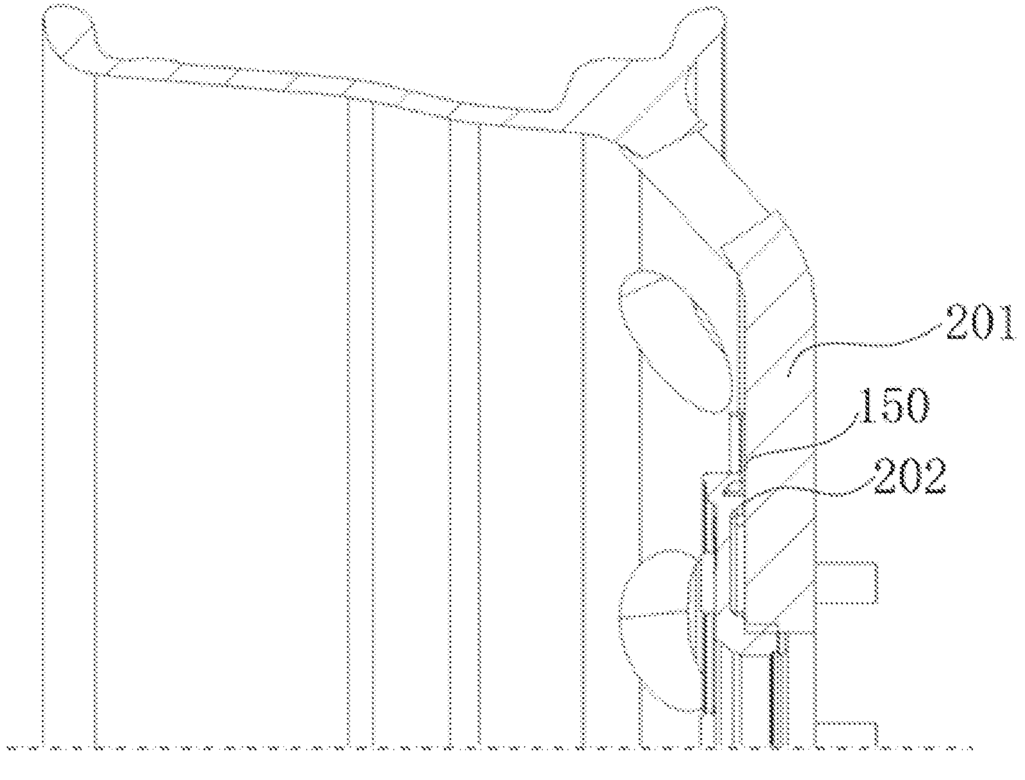
FIG. 5 exemplifies a cross-sectional view for fitting the dustproof member with the wheel rim and the rotating shaft in the present disclosure.

With reference to FIG. 4 to FIG. 5 and in combination with FIG. 2 to FIG. 3, the present embodiment further provides an inner wheel drive system. The inner wheel drive system comprises a first component 110, a second component 120, the aforementioned sealing structure 100 and a wheel rim 201. Therein, the first component 110 is a rotating shaft 202 of the inner wheel drive system; the second component 120 is a housing of the inner wheel drive system, and the housing surrounds the rotating shaft 202 in a circumferential direction; the wheel rim 201 is fixed to a position of an axial outer side of the dustproof member 150, and an end face of an axial inner side of the wheel rim 201 causes the dustproof member 150 to be pressed against an axial inner side in an axial direction, thereby further ensuring that the dustproof member 150 is effectively fixed.

Specifically, with reference to FIG. 4 and FIG. 5, the first component 110 is the rotating shaft 202 of the inner wheel drive system, the wheel rim 201 is assembled on an axial outer side of the rotating shaft 202 by a bolt, the dustproof member 150 and the rotating shaft 202 are fixed, and the dustproof member is located between the rotating shaft 202 and the wheel rim 201, so that the fixed wheel rim 201 can apply a pressing force which points to the axial inner side to the dustproof member 150, thereby enabling the dustproof member 150 to be better fixed to the rotating shaft 202 to achieve the stable assembly of the dustproof member 150.

It can be understood that the exemplary descriptions of the sealing structure 100 in the aforementioned embodiments are applicable to the inner wheel drive system of the present embodiment, and when the sealing structure is applied to the inner wheel drive system, the same effect as that in the aforementioned embodiments can also be achieved, which will not be described in detail in the present embodiment.

It can thus be seen that in the inner wheel drive system provided by the present disclosure, due to the arrangement of the sealing structure 100, the axial size of the radial clearance 130 can be reduced, thereby being helpful for the reduction of the axial size of the inner wheel drive system, and enabling the inner wheel drive system to be applicable to wider use scenarios (especially applicable to the use scenarios of narrow and small spaces). Moreover, by the arrangement of the wheel rim 201 pressing against the dustproof member 150, the connection of the dustproof member 150 is made more stable, thereby ensuring that the sealing structure 100 can achieve good dustproof and leakproof effects.

In combination with FIG. 2 to FIG. 5, the present disclosure further provides a method for assembling a dustproof member 150 in a sealing structure 100, wherein the sealing structure 100 is used for sealing a radial clearance 130 between a first component 110 and a second component 120, the sealing structure 100 comprises a sealing member 140 and a dustproof member 150, and the sealing member 140 is sealed in the radial clearance 130; the dustproof member 150 has a first end and a second end opposite to each other, the first end is provided with a mounting part, and the first component 110 is provided with a fitting part corresponding to the mounting part and is provided with a stopping part 112.

It can be understood that the exemplary descriptions of the sealing structure 100 in the aforementioned embodiments are applicable to the sealing structure 100 in the assembly method of the present embodiment, and the sealing structure can also achieve the effects corresponding to those of the aforementioned embodiments, which will not be described in detail in the present embodiment.

During assembling, the mounting part is fitted into the fitting part, and a position of the dustproof member 150 is adjusted until the stopping part 112 is stopped on an axial inner side of the dustproof member 150, so that the second end and the second component 120 are spaced apart and partially overlap with each other in an axial direction.

Specifically, in combination with FIG. 2 and FIG. 3, the dustproof member 150 is first placed on the axial outer side of the radial clearance 130, then the first axial extension segment 152 (that is, the mounting part) is inserted into the axial fitting groove 111 (that is, the fitting part) in the axial direction, and afterwards, the position of the dustproof member 150 is adjusted until the axial inner side of the radial segment 151 of the dustproof member 150 abuts against an axial front end of the stopping part 112. At that time, the dustproof member 150 has been fixed to the position where it is required to be mounted on the outer side of the axial clearance by the interference fit between the first axial extension segment 152 and the axial fitting groove 111.

Further, in combination with FIG. 4 and FIG. 5, when the sealing structure 100 is used in the inner wheel drive system, the first component 110 is the rotating shaft 202 of the inner wheel drive system. After the dustproof member 150 has been fixed to the axial outer side of the rotating shaft 202 by the fitting of the mounting part and the fitting part, the wheel rim 201 and the rotating shaft 202 are then fixed, and the wheel rim 201 is located at the position of the axial outer side of the dustproof member 150, so that the fixed wheel rim 201 can apply a pressing force to the dustproof member 150 which points to the axial inner side, and the dustproof member 150 is caused to be better fixed to the rotating shaft 202 to achieve the stable assembly of the dustproof member 150.

It can thus be seen that the method for assembling a dustproof member 150 in a sealing structure 100 provided by the present disclosure achieves a quick connection and fixation of the dustproof member 150 and the first component 110 by the fitting of the mounting part and the fitting part, and the position where the dustproof member 150 is required to be mounted is conveniently and quickly determined by the stopping part 112, which is helpful for quickly and accurately fixing the dustproof member 150 to the axial outer side of the radial clearance 130.

The invention claimed is:

1. A sealing structure comprising:

a first component comprising a first side wall, a second side wall, a stopping part, and a radial outer side, the first side wall and the second side wall defining an axial fitting groove, the stopping part extending radially outward from the second side wall to the radial outer side, the second side wall and the radial outer side extending axially from opposing ends of the stopping part;

a second component, a radial clearance defined between the first component and the second component;

a sealing member sealed in the radial clearance and fixed to the second component, the sealing member sealed to the radial outer side; and a dustproof member located on an axial outer side of the sealing member, the dustproof member comprising:

a first axial extension segment defining a first end of the dustproof member, the first axial extension segment is fixed on the first component by abutting against and being fixed to the first side wall with an interference fit, a radial avoidance clearance is formed between the first axial extension segment and the second side wall of the axial fitting groove;

a radial segment extending in a radial direction and covering the radial clearance, the first axial extension segment extending axially from the radial segment; and a second axial extension segment axially extending from the radial segment and defining a second end of the dustproof member, the second end and the second component are spaced apart and partially overlap with each other in an axial direction.

2. The sealing structure of claim 1, wherein the sealing member comprises sealing lips that are sealed to the radial segment.

3. The sealing structure of claim 1, wherein the axial fitting groove is located on an end face of an axial outer side of the first component.

4. The sealing structure of claim 3, wherein the first side wall is located on a radial inner side of the axial fitting groove, and the second side wall is located on a radial outer side of the axial fitting groove.

5. The sealing structure of claim 1, wherein the stopping part does not exceed an axial end face of the first component in a direction of an axial outer side of the first component, and the stopping part stops on an axial inner side of the dustproof member to position the dustproof member.

6. The sealing structure of claim 1, wherein the dustproof member comprises a dustproof segment arranged on an axial inner side of the second end, and the dustproof segment and the second component partially overlap with each other in the axial direction.

7. The sealing structure of claim 6, wherein the second component is provided with an avoidance part, the avoidance part corresponds to the dustproof segment, and a labyrinth clearance having at least one bend is formed between the avoidance part and the dustproof segment.

8. The sealing structure of claim 1, wherein the axial outer side of the sealing member is further provided with a sealing lip, and the sealing lip has an annular sealing groove arranged toward a radial outer side.

9. An inner wheel drive system comprising:

the sealing structure of claim 1, the first component is a rotating shaft of the inner wheel drive system, the second component is a housing of the inner wheel drive system, the housing surrounds the rotating shaft in a circumferential direction; and a wheel rim which is pressed against an axial outer side of the dustproof member.

10. A method for assembling a dustproof member in a sealing structure the method comprising:

providing the sealing structure comprising a first component, a second component, a sealing member, and the dustproof member, the first component comprising a first side wall, a second side wall, a stopping part, and a radial outer side, the first side wall and the second side wall defining an axial fitting groove, the stopping part extending radially outward from the second side wall to the radial outer side, the second side wall and the radial outer side extending axially from opposing ends of the stopping part, a radial clearance defined between the first component and the second component, the sealing member being sealed in the radial clearance and fixed to the second component, the sealing member sealed to the radial outer side, the dustproof member has a first end and a second end opposite to each other, the first end is provided with a mounting part, the mounting part is a first axial extension segment, the first component is provided with a fitting part corresponding to the mounting part, the fitting part being the axial fitting groove, the first axial extension segment is fixed on the first component by abutting against and being fixed to the first side wall with an interference fit, a radial avoidance clearance is formed between the first axial extension segment and the second side wall of the axial fitting groove; and during assembly, fitting the mounting part into the fitting part and adjusting a position of the dustproof member until the stopping part is stopped on an axial inner side of the dustproof member, so that the second end and the second component are spaced apart and partially overlap with each other in an axial direction.

11. A sealing structure comprising:

a first component comprising a first side wall, a second side wall, a stopping part, and a radial outer side, the first side wall and the second side wall defining an axial fitting groove, the stopping part extending radially outward from the second side wall to the radial outer side, the second side wall and the radial outer side extending axially from opposing ends of the stopping part;

a second component, a radial clearance defined between the first component and the second component;

a sealing member sealed in the radial clearance between the first component and the second component, the sealing member fixed to the second component, the sealing member sealed to the radial outer side; and a dustproof member located on an axial outer side of the sealing member, the dustproof member comprising:

a first axial extension segment defining a first end of the dustproof member, the first axial extension segment is fitted into the axial fitting groove in an interference mode and is fixed on the first component by abutting against and being fixed to the first side wall with an interference fit to fix the dustproof member and the first component, a radial avoidance clearance is formed between the first axial extension segment and the second side wall of the axial fitting groove;

a radial segment extending in a radial direction to cover the radial clearance the first axial extension segment extending axially from the radial segment; and a second axial extension segment axially extending from the radial segment and defining a second end of the dustproof member, the second end and the second component are spaced apart and partially overlap with each other in an axial direction.

12. The sealing structure of claim 11, wherein the sealing member comprises sealing lips that are sealed to the radial segment.

13. The sealing structure of claim 11, wherein the axial fitting groove is located on an end face of an axial outer side of the first component.

14. The sealing structure of claim 13, wherein the first side wall is located on a radial inner side of the axial fitting groove, and the second side wall is located on a radial outer side of the axial fitting groove.

15. The sealing structure of claim 11, wherein the stopping part does not exceed an axial end face of the first component in a direction of an axial outer side of the first component, and the stopping part stops on an axial inner side of the dustproof member to position the dustproof member.

16. The sealing structure of claim 11, wherein the dustproof member comprises a dustproof segment arranged on an axial inner side of the second end, and the dustproof segment and the second component partially overlap with each other in the axial direction.

17. The sealing structure of claim 16, wherein the second component is provided with an avoidance part, the avoidance part corresponds to the dustproof segment, and a labyrinth clearance having at least one bend is formed between the avoidance part and the dustproof segment.

18. The sealing structure of claim 11, wherein the axial outer side of the sealing member comprises a sealing lip, and the sealing lip has an annular sealing groove arranged toward a radial outer side.

19. The sealing structure of claim 11, wherein the first component comprises a rotating shaft and the second component comprises a housing surrounding the rotating shaft.

20. An inner wheel drive system comprising:

the sealing structure of claim 11, the first component comprises a rotating shaft, the second component comprises a housing surrounding the rotating shaft in a circumferential direction; and a wheel rim, wherein the wheel rim is secured against an axial outer side of the dustproof member.

* * * * *